(12) United States Patent
Brown et al.

(10) Patent No.: US 10,203,065 B2
(45) Date of Patent: *Feb. 12, 2019

(54) BRACKET FOR MOUNTING EXPANSION TANKS AND OTHER PLUMBING DEVICES TO A BUILDING SURFACE

(71) Applicant: Reliance Worldwide Corporation, Atlanta, GA (US)

(72) Inventors: Larry Brown, Poway, CA (US); Virgil O'Neil, Poway, CA (US)

(73) Assignee: Reliance Worldwide Corporation, Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,050

(22) Filed: Feb. 23, 2017

(65) Prior Publication Data

US 2017/0159877 A1 Jun. 8, 2017

Related U.S. Application Data

(63) Continuation of application No. 13/804,576, filed on Mar. 14, 2013, now Pat. No. 9,605,798.

(60) Provisional application No. 61/667,752, filed on Jul. 3, 2012.

(51) Int. Cl.
*B65D 25/24* (2006.01)
*F16M 13/02* (2006.01)
*F24D 3/10* (2006.01)
*B23P 19/00* (2006.01)

(52) U.S. Cl.
CPC ............. *F16M 13/02* (2013.01); *B23P 19/00* (2013.01); *F24D 3/1016* (2013.01); *Y10T 29/49948* (2015.01)

(58) Field of Classification Search
CPC ..................................................... A62C 13/78
USPC ....... 248/671, 680, 213.2, 218.4, 219.1, 310, 248/311.2, 313, 316.1, 505, 507, 510, 907
See application file for complete search history.

(56) References Cited

U.S. PATENT DOCUMENTS

| 991,192 A | 5/1911 | Battenfeld | |
| 2,431,698 A | 12/1947 | Lombard | |
| 2,615,238 A * | 10/1952 | Highwood | F17C 13/084 248/146 |
| 2,870,982 A | 1/1959 | Greene et al. | |
| 3,193,232 A | 7/1965 | Hatcher | |
| 3,579,754 A * | 5/1971 | Oetiker | F16L 33/04 24/279 |
| 3,780,972 A | 12/1973 | Brodersen | |
| 4,213,592 A * | 7/1980 | Lingenfelser | A62C 13/78 248/313 |
| 4,286,361 A * | 9/1981 | MacKenzie | F16L 33/08 24/20 LS |
| 4,379,541 A | 4/1983 | Harkness | |

(Continued)

*Primary Examiner* — Terrell L McKinnon
*Assistant Examiner* — Michael McDuffie
(74) *Attorney, Agent, or Firm* — Stetina Brunda Garred & Brucker; Lowell Anderson

(57) ABSTRACT

An expansion tank is fastened to a support using a bracket with a U-shaped cross-section formed by a back and two sidewalls. The edges of the sidewalls each have a notch mating with a weld bead on the tank. Fasteners hold the back of the bracket to the support. First and second hose clamps pass through the sidewalls by the back to encircle the tank and clamp it to the edges of the sidewall when the hose clamps are tightened.

24 Claims, 9 Drawing Sheets

(56) References Cited

U.S. PATENT DOCUMENTS

| | | | |
|---|---|---|---|
| 4,848,714 A * | 7/1989 | Ziaylek, Jr. | A62B 9/04 248/313 |
| 4,955,573 A | 9/1990 | Horvath | |
| D319,778 S | 9/1991 | Ziaylek, Jr. | |
| 5,071,100 A | 12/1991 | Sweeny | |
| 5,190,260 A | 3/1993 | Daubenspeck | |
| 5,362,022 A | 11/1994 | McLoughlin et al. | |
| 5,487,518 A | 1/1996 | McCraney et al. | |
| 5,897,086 A | 4/1999 | Condon | |
| 6,095,472 A * | 8/2000 | Hubbard | F24H 9/06 248/225.11 |
| 6,220,557 B1 * | 4/2001 | Ziaylek | A62C 13/78 248/154 |
| 6,702,242 B1 * | 3/2004 | Ziaylek, Jr. | B60N 2/24 248/154 |
| 6,769,659 B1 * | 8/2004 | Martello | B60N 3/103 248/154 |
| 6,926,243 B1 * | 8/2005 | Ziaylek | A62B 25/00 248/307 |
| 7,503,535 B2 | 3/2009 | Ziaylek | |
| 7,650,948 B2 * | 1/2010 | Rousseau | A62C 13/70 169/23 |
| 8,052,209 B2 * | 11/2011 | Bostrom | A62B 9/04 224/275 |
| 8,191,848 B2 * | 6/2012 | McLoughlin | A62B 25/00 248/313 |
| 8,220,764 B2 * | 7/2012 | Ziaylek | A62B 25/00 224/275 |
| 8,668,178 B2 * | 3/2014 | Ziaylek | F17C 13/084 224/570 |
| 9,605,798 B2 * | 3/2017 | Brown | F16M 13/02 |
| 2004/0089459 A1 * | 5/2004 | Folks | A62C 13/78 169/30 |
| 2014/0103130 A1 * | 4/2014 | Brown | F16M 13/02 237/66 |

* cited by examiner

BRACKET FOR MOUNTING EXPANSION TANKS AND OTHER PLUMBING DEVICES TO A BUILDING SURFACE

CROSS-REFERENCE TO RELATED APPLICATIONS

The application claims the benefit under 35 U.S.C. § 119(e) to Provisional Patent Application No. 61/667,752 filed Jul. 3, 2012, the entire contents of which are incorporated herein by reference.

BACKGROUND

The present disclosure involves a novel bracket assembly for mounting cylindrical devices for use with plumbing systems, to a building surface, while allowing easy installation and removal of the cylindrical devices as desired. Although other uses are contemplated, for illustrative purposes the bracket is used to secure a thermal expansion tank such as is commonly used in both potable and non-potable hot water plumbing systems. Illustrations for this application are included at the end of this text.

In a hot water heating system as is commonly found in domestic potable water supply or non-potable hot water space heating systems, the fluid contents are subject to expansion and contraction as the water is heated and cooled. As heated water is withdrawn from the hot water heater cold water is introduced into the tank. If five gallons of cold water are added then when that water is heated to 100° F.-200° F. by the heater, the water expands. If the water is added during winter to a heater located in areas where snow is on the ground, the inlet water temperature can be slightly above freezing, namely 32° F. or 0° C. Because water is not compressible under normal conditions, the surplus or deficit in volume can cause a pressure changes and displacements within the piping system.

Most particularly, when the water is heated and there is no flow because all valves, faucets, backflow devices, check valves, etc., are in a closed state, the system pressure can increase dramatically. This can place a significant and potentially dangerous strain on system components, including valves, piping, and elements of the water heating equipment. Further, because most such systems are isolated for public safety reasons from the common water source (e.g., the city water main in potable hot water systems) by a one-way "anti-backflow" valve, the pressure increase cannot be relieved by a back-flow out of the local system, and the system is sealed, or closed. Water heating equipment may be furnished with pressure-relief devices to address this situation, but such devices are notoriously subject to failure due to corrosion or buildup of mineral deposits from the domestic water supply, especially over the multi-year life of a water heater.

An auxiliary device introduced into the water heating system to ameliorate this situation is the thermal expansion tank. This expansion tank typically includes a small hollow container incorporating a flexible diaphragm which divides the interior of the expansion tank into two compartments. One compartment has an opening which is connected to the water piping so that water may enter and the other compartment has an air valve so that an air pressure charge may be injected into the tank.

When this expansion tank is connected to the water system piping on the incoming side of the system, upstream of the water heater, and when a charge of air is injected at an appropriate pressure into the expansion tank compartment, the dual chambers of the expansion tank act as a buffer for pressure changes in the system and relieve the stresses on the closed system caused by pressure changes arising from expansion of heated water. When the water is heated and the pressure rises then water flows into the expansion tank and relieves the over-pressure condition. When the water cools or the system flows (e.g., by opening a faucet), water returns from the expansion tank to the piping. This equipment and technique have been incorporated as a requirement into many building codes and construction specifications.

When the weight of the maximum incursion of water into the expansion tank chamber is taken into account, the entire unit for a typical residential hot water installation may weigh as much as 18-35 pounds, depending on the system capacity and the level of incoming water pressure. However, with the exception of generic requirements in some commercial and government documents, the specific method and apparatus used to secure the expansion tank against vibration and movement relative to the building structure is largely left up to the installer, and is typically an afterthought to the building construction. Currently available brackets are cumbersome to install and use, and require large brackets because the brackets provide a bottom shelf on which the expansion tank rests.

There is thus a need for a simpler and lighter method and apparatus to hold the expansion tanks.

BRIEF SUMMARY

The present bracket assembly may be easily and effectively employed to mount an auxiliary thermal expansion tank such as described above to a building wall or other surface. Further, other devices within a piping or plumbing system must be secured to building surfaces for aesthetic, safety or functional reasons, and a number of these devices are essentially cylindrical in shape, including, without limitation, water filtration units, regulators, pipe fittings or solenoid valves. The present bracket assembly is suitable and advantageous for the purpose of mounting these other types of devices, as well.

One purpose of this bracket assembly is to position and stabilize the tank or other device or equipment against vibration or motion which could cause damage to the device, piping or other building components. Applicable criteria may come from safety, regulatory, engineering or aesthetic specifications, or from other requirements.

Another purpose of the bracket assembly is to provide an easy to manufacture, economical, effective and standardized device and method for accomplishing the function of mounting an expansion tank or other plumbing device to a building surface, where the typical prior art installation, if secured at all, is performed using makeshift materials and methods. For example, it has been common practice to attach a thermal expansion tank to the building structure using bent metal formed on-site, or to fasten the bracket with nails and perforated metal hardware strapping, or to merely allow the tank to be suspended from the plumbing piping itself. These alternative methods are inefficient, unsafe, and aesthetically undesirable, not in compliance with increasingly-stringent building and plumbing codes, or combinations of the above.

There is thus advantageously provided an apparatus for holding a tank to a support, the apparatus including a single-piece bracket having a back and two opposing side walls forming a U shaped cross section with the side walls ending in generally parallel edges. Each side wall has first and second sets of aligned slots parallel to the back and immediately adjacent thereto, preferably within about ¼ inch of the back. The first and second sets of slots are spaced apart from each other a distance D. The back of the bracket has a plurality of fastener holes sized to pass the shaft of a fastener while preventing passage of a head of the fasteners during use. The apparatus may also include a first hose clamp strap and first connector with the first strap extending through the first set of aligned slots, the strap having a length sufficient to encircle the tank during use. The apparatus may include a second hose clamp strap and second connector with the second strap extending through the second set of aligned slots. The straps have a length sufficient to encircle the tank during use. Each side wall edge has an aligned notch therein sized to receive a weld bead on said tank and abut one edge of that bead during use. The notch is located so it is between the first and second straps during use.

In further variations, the notch is V shaped. The distance D is a few inches and the notch is less than about one-quarter of an inch deep. The slots have a length about twice the width of the strap passing therethrough and a width less than about ten times a thickness of the strap passing therethrough. The side walls may have a plurality of parallel, aligned slots therein contained completely within the sidewalls. The back may be longer than the side walls. The apparatus may include a cylindrical tank having a diameter of about 4-15 inches with a welded bead encircling the tank's sidewall. The bead fits into the notch and the hose clamps encircle the tank sidewall during use to clamp the tank against the edges of the two brace sidewalls. The apparatus may also include a fluid expansion tank having a diameter of about 4-15 inches with a flexible diaphragm dividing the tank into compartments, with the expansion tank having a cylindrical tank sidewall with a welded bead encircling the tank sidewall and the bead fitting in the notch so that the hose clamps encircle the tank sidewall and clamp the tank against the edges of the two sidewalls. The brace sidewalls are preferably about two inches apart.

There is also advantageously provided a kit for holding a tank against a support. The kit may include a single-piece bracket having a back and two opposing side walls forming a U shaped cross section with the side walls ending in generally parallel edges. Each bracket side wall having first and second sets of aligned slots parallel to the back and immediately adjacent thereto. The first and second sets of slots are spaced apart from each other a distance D. The back of the bracket has a plurality of fastener holes sized to pass the shaft of a fastener while preventing passage of a head of the fasteners during use. The kit also includes a first hose clamp strap and first connector with the first strap sized and configured to extend through the first set of aligned slots during use. The first strap has a length sufficient to encircle the tank and pass through the first two aligned slots during use. The kit includes a second hose clamp strap and second connector with the second strap extending through the second set of aligned slots during use. The second strap has a length sufficient to encircle the tank and pass through the second two aligned slots during use. Each side wall edge has an aligned notch therein sized to receive a weld bead on said tank and abut one edge of that bead during use.

In further variations, the notch is V shaped. The distance D is a few inches and the notch is less than about one-quarter of an inch deep. The slots have a length of about one inch long or shorter and about ¼ inch wide or smaller. The side walls may have a plurality of parallel, aligned slots therein contained completely within the sidewalls. The back may be longer than the side walls. The apparatus may include a cylindrical tank having a diameter of about 4-15 inches with a welded bead encircling the tank's sidewall. The bead fits into the notch and the hose clamps encircle the tank sidewall during use to clamp the tank against the edges of the two brace sidewalls. The apparatus may also include a fluid expansion tank having a diameter of about 4-15 inches with a flexible diaphragm dividing the tank into compartments, with the expansion tank having a cylindrical tank sidewall with a welded bead encircling the tank sidewall and the bead fitting in the notch so that the hose clamps encircle the tank sidewall and clamp the tank against the edges of the two sidewalls. The brace sidewalls are preferably about two inches apart.

There is also advantageously provided a method for holding a tank against a support. The method includes the steps of fastening a bracket to the support where the bracket has a back and two opposing side walls forming a U shaped cross section with the side walls ending in generally parallel edges. Each side wall has first and second sets of aligned slots parallel to the back and immediately adjacent thereto, with the first and second set of slots spaced apart from each other a distance D. The back of the bracket has a plurality of fastener holes with the shaft of a fastener passing through a plurality of said holes to fasten the bracket to the support. The method also includes placing the tank against the edges of the side walls and encircling the tank with a first hose clamp strap having a first connector with the first strap extending through the first set of aligned slots. The first strap is tightened with the first connector to pull the tank against the edges of the bracket sidewalls. The method also includes encircling the tank with a second hose clamp strap having and second connector. The second hose extends through the second set of aligned slots. The second strap is tightened with the second connector to pull the tank against the edges of the bracket sidewalls. The tank has a weld bead on a sidewall of the tank with the weld bead being located in the notches and the notches are located between the first and second straps. The method may optionally include an expansion tank with a flexible divider therein.

BRIEF DESCRIPTION OF THE DRAWINGS

The above, and other features and advantages of the present invention are further described in the following drawings and description in which like numbers refer to like parts throughout, and in which.

DETAILED DESCRIPTION

Figure 1B:
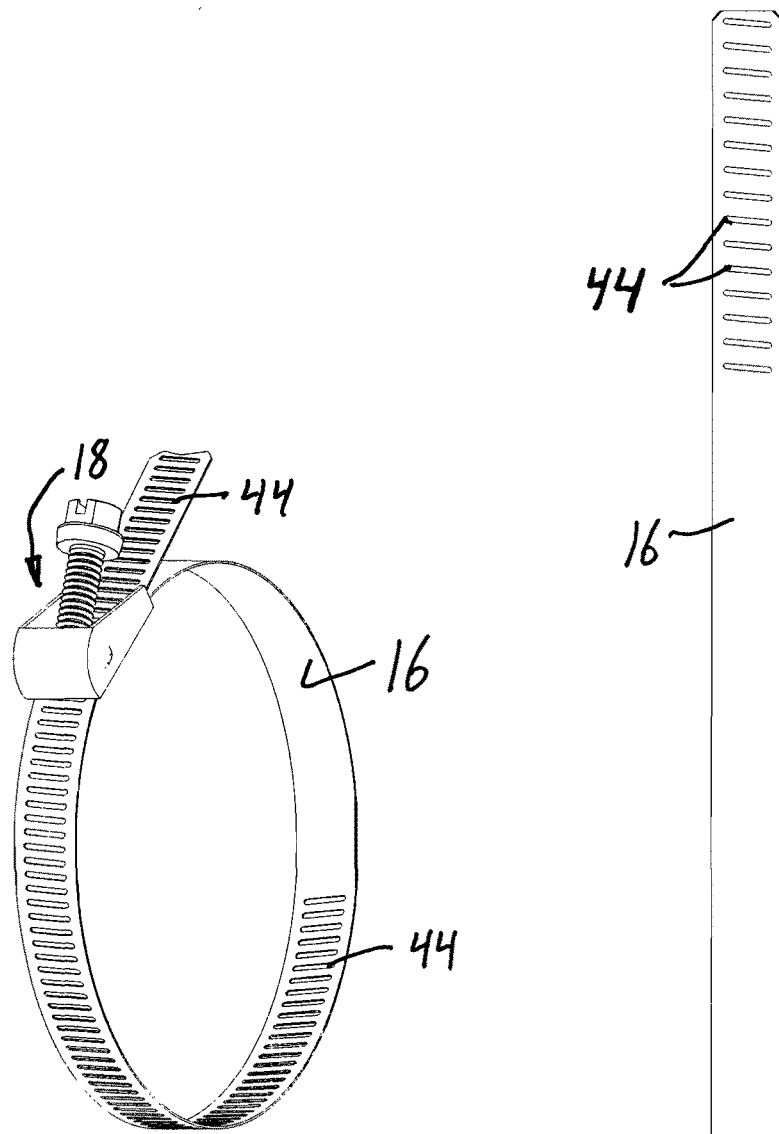
FIG. 1b is a perspective view of the strap of FIG. 1 connected in a loop.

Referring to FIGS. 3-6, a bracket assembly 10 is provided that has two primary components acting in cooperation to hold a tank 12 (FIG. 5), namely a brace 14 and adjustable length straps 16 each having a connector 18. The straps 16 hold the tank 12 to the brace 14, with the brace in turn being fastened to a support 20 (FIG. 5) by fasteners 38, such as nails, screws etc. The bracket 14 may be made of metal, plastic or other suitable material, which is shaped so as to mount against a building surface 18, preferably flat. The bracket 14 has a back 22 and two opposing side walls 24a, 24b joined to the back to form a U-shaped channel, having a U-shaped cross-section. The brace sidewalls are preferably parallel to each other and have a distal edge 26a, 26b (FIG. 4) which abuts a sidewall of the tank 16 during use.

The tank 12 typically has a circumferential welding bead 28 where two portions of the tank are welded together. The brace 14 has notches 30a, 30b extending inward from the edges 26a, 26b, respectively, with the notches 30 sized to receive the bead 28 and abut the lower edge of the bead to restrain vertical movement of the tank relative to the brace during use. The back portion 22 of the brace 14 has a plurality of holes 36 through which the shafts of a fastener 38 passes during use, with a head of the fastener being larger than the holes 36 so the head urges the back 22 against the support 20 during use.

Figure 1A:
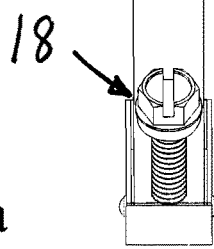
FIG. 1a is a plan view of a holding strap and adjustable connector.

The straps 16 are preferably flat straps with a rectangular cross section oriented to lie flat against the tank sidewall during use. The straps may be made of metal strap, or made of woven metal or polymer or fiber material. If made of metal, straps 16 preferably take the form of hose clamps or band clamps having a plurality of slots or shaped openings 44 cooperating with connector 18 which comprises a screw having threads configured to engage the openings and shorten or lengthen the loop enclosed by the strap 16 and connector 18 when the screw/connector 18 is rotated. The preferred connector 18 features a captive worm-drive screw which is anchored at one end, allowing it to pivot within a housing attached to the strap 16. Pivoting the screw toward the strap, so that the threads contact and penetrate into the slots or openings 44 on the strap, allows the strap to be tightened by advancing the screw clockwise. The shape of the screw threads cooperates with the shape and inclination of the slots 44, such that the screw is retained even when considerable torque is applied to the screw. By loosening the screw slightly counter-clockwise, the screw may be pivoted away from the strap, which instantly releases the strap for removal or repositioning. This connector 18 allows quick and easy installation, particularly useful in restricted or difficult areas. The slots 44 may be perpendicular to the parallel edges of the strap 16 as in FIG. 1b, or they may be inclined as in FIG. 1a.

While a hose clamp as strap 16 with a tightening screw as the connector 18 is the preferred connector, other connectors 18 could be used, including the connectors found in U.S. Pat. No. 6,095,472, the complete contents of which are incorporated herein by reference. The straps 16 preferably comprise a single, continuous piece of material, preferably steel, preferably a hose clamp. The straps 16 have sufficient length to encircle the tank 12 during use. The straps connect the tank 12 to the brace 14 by pulling the tank against the brace as the straps pass through openings 40 in the brace.

First and second sets of slots 40a, 40b are formed in each of the sidewalls 24a, 24b, adjacent the back portion 22, so that a first slots 40a in brace sidewall 24a is opposite first slot 40a in brace sidewall 24b. Likewise, second slot 40b in brace sidewall 24a is opposite second slot 40b in brace sidewall 24b. The two slots 40a are parallel to each other, as are the two slots 40b. One slot 40 of each set being on separate axes parallel to each other and parallel to a longitudinal axis 23 of the back 22, such that the slots 40a, 40b on one sidewall 24a are on a common axis and the slots 40a, 40b on the other sidewall 24b are on a common axis, which axes are parallel.

The slots 40 conform to the shape of the straps 16 which are preferably flat straps having a rectangular cross section, and thus the slots 40 are rectangular (preferably with rounded ends to reduce stress) with the long side parallel to the bottom or back 22. The slots 40 are sized sufficiently larger than the straps 16 to allow easy passage of the straps through the slots. The slots 40 are advantageously located adjacent the back 22, within a distance corresponding to twice the width of the slot 40. Preferably the slots 40 are about ⅛ inch wide and about one inch long for a band or strap 16 that is about ½ inch wide and 0.025 inches thick. One long edge of each slot 40 is advantageously flush with the back 22, and preferably within about ⅛ inch of the back 22, so as to react the loads carried by the strap 16 more directly to the back 22 rather than through the sidewalls 24. Sidewalls 24 made of 16 gage galvanized steel are believed suitable for tanks comprising expansion tanks of 15 inch diameter or less, having a length of 24 inches or less. The closest ends of slots 40a, 40b on each sidewall 24a, or 24b are spaced apart a distance D of a few inches, preferably less than five inches, and more preferable about 2-3 inches, and still more preferably about 2.3 inches.

The straps 16 pass through the slots 40a, 40b in opposing sidewalls 24a, 24b and encircle the tank 12, with the connector 18 connecting the opposing ends of each strap 16 and shortening the length to tighten the strap which pulls the sidewall of the tank 12 against the brace 14, and specifically pulls the tank against the edges 26 of the brace 14. Advantageously, the edges 26 are square edges and not broken so that the edges may more easily dig into the surface of the tank 12 as the straps 16 are tightened by connector 18 and more securely connect the brace and tank. A slight interference fit between the edges 26 and the sidewalls of the tank 12 are preferred to restrain the tank from moving relative to the brace 14. That configuration of strap 16 places the connector 18 at one side of the tank 12 during installation and makes installation easier. That configuration places the slots 44 in strap 16 between the brace 14 and the connector 18 so as to provide a stronger connection. It is desirable that the slots 44 in the strap 16 not be located at the bend formed where the strap exits the slot 40 in the brace 14 since that would provide a connection more subject to breaking.

Figure 2:
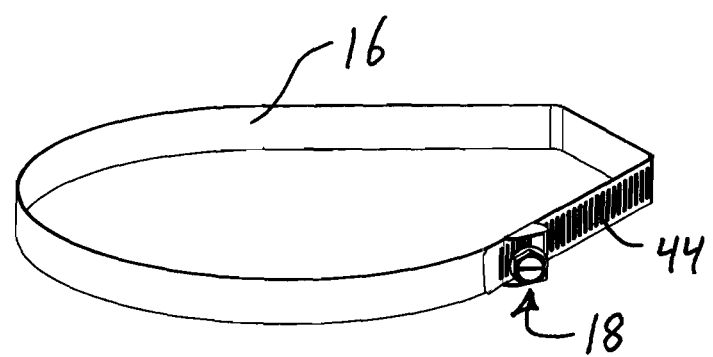
FIG. 2 is a perspective view of the strap of FIG. 1a bent into the configuration in which the strap typically deforms when used with the bracket of FIG. 3.
Figure 3:
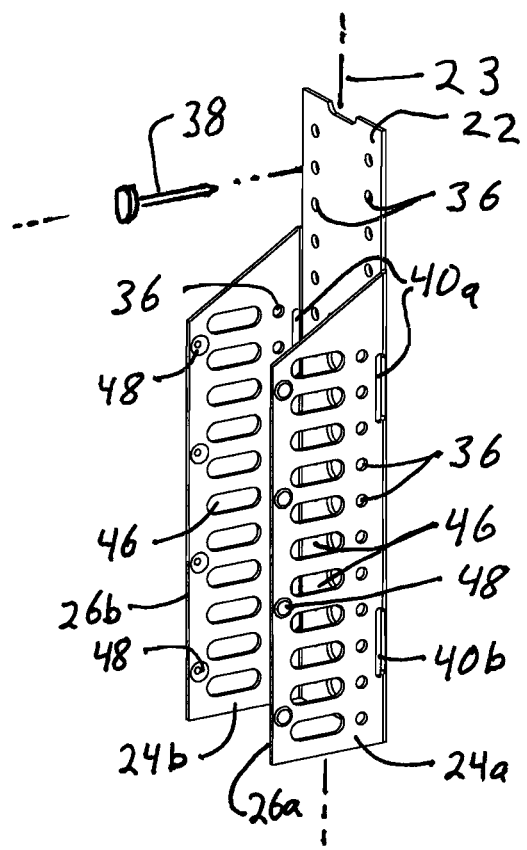
FIG. 3 is a brace or bracket for fastening a tank to a wall, with a plurality of apertures to receive connecting straps.
Figure 4:
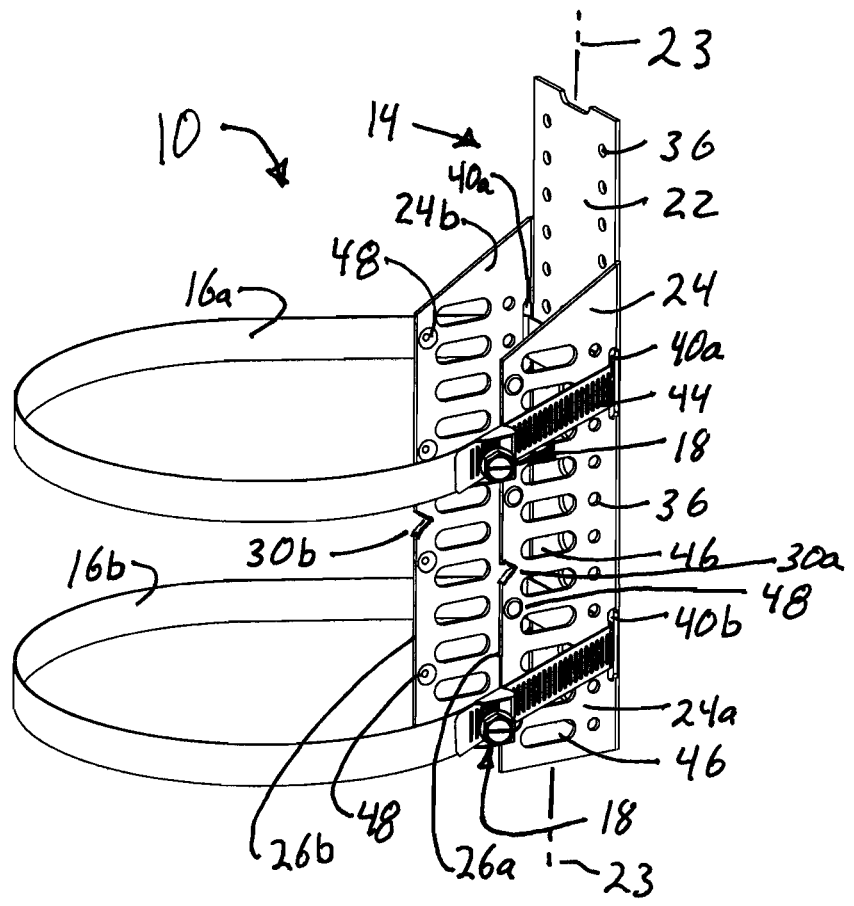
FIG. 4 is a perspective view of the straps of FIGS. 1-2 connected to the brace or bracket of FIG. 3.
Figure 5:
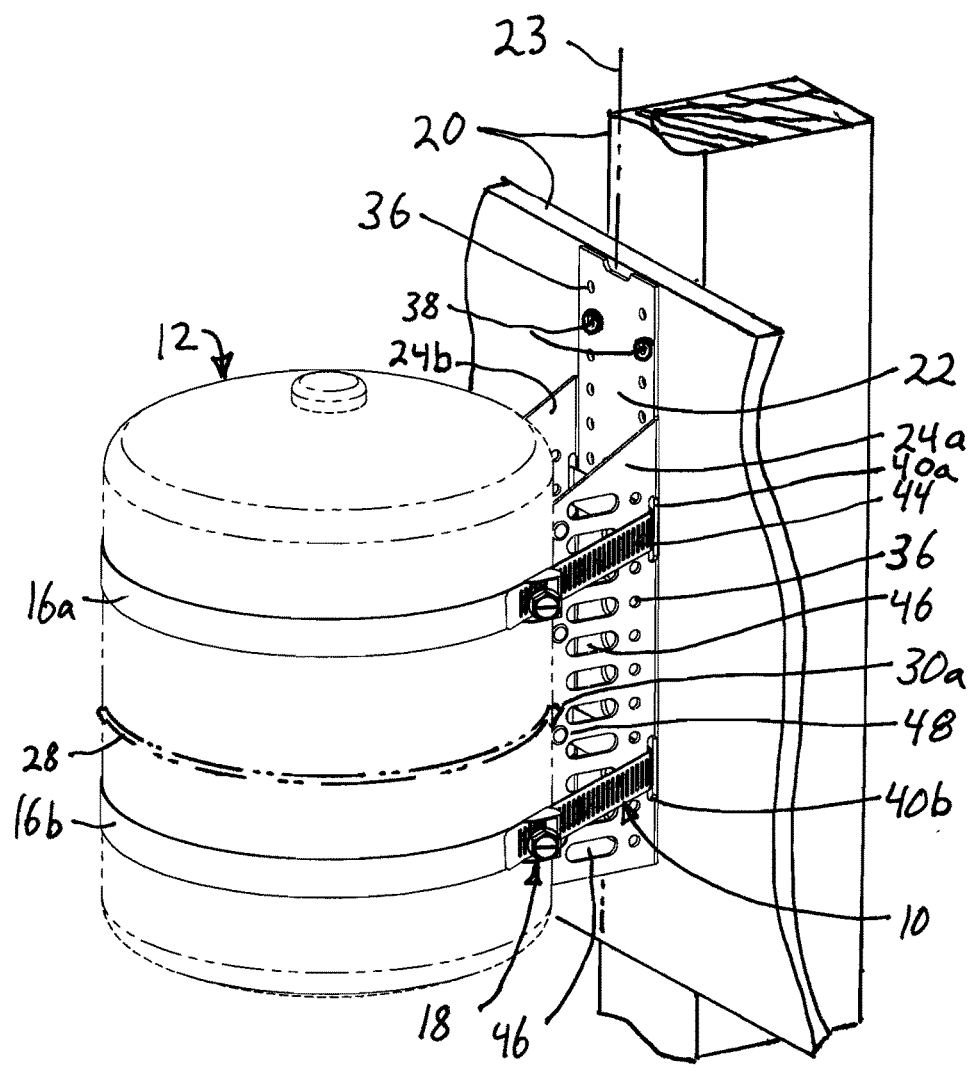
FIG. 5 is a perspective view of the brace or bracket of FIG. 3 and straps of FIGS. 1-2 in use to hold a tank.
Figure 6:
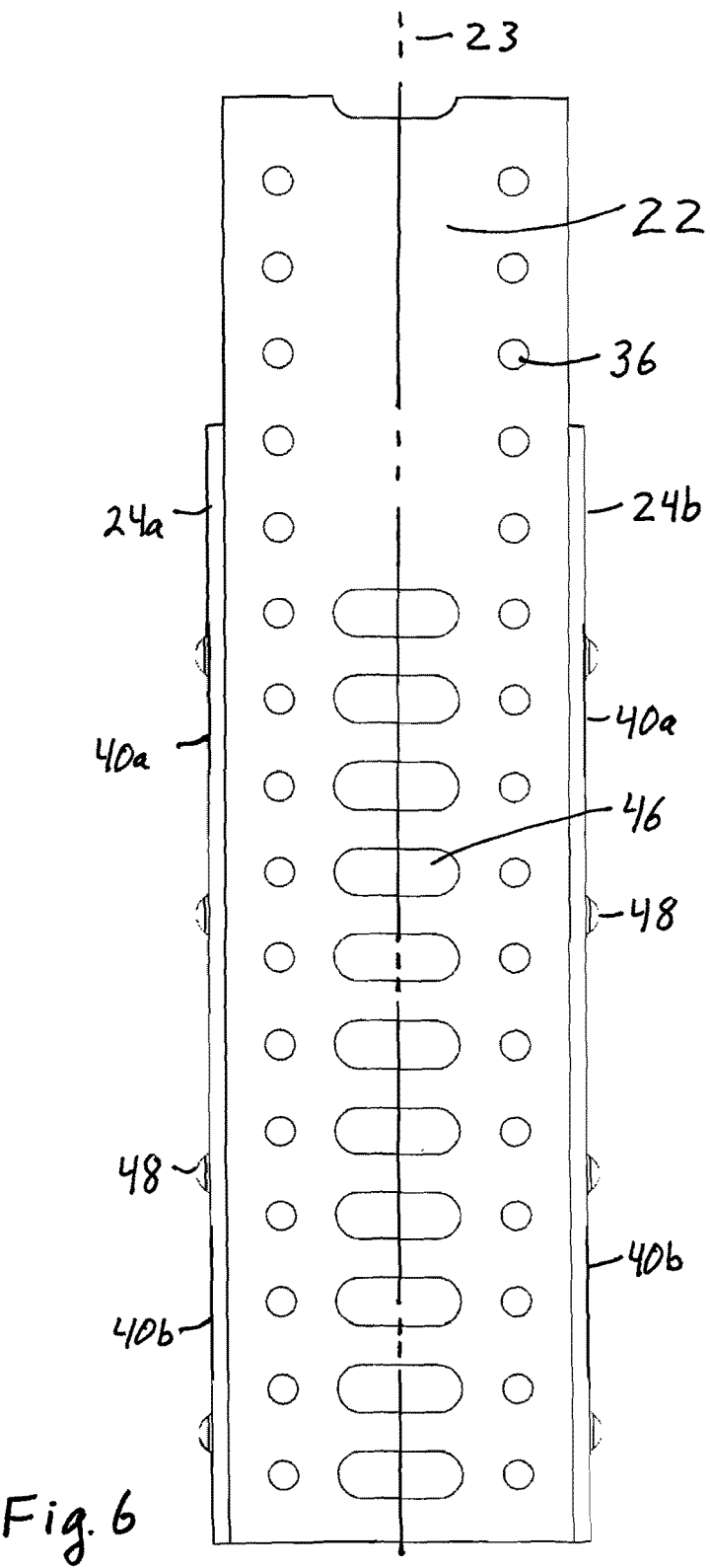
FIG. 6 is a plan view of the back side of the brace or bracket of FIG. 3.

Referring to FIGS. 2 and 5, preferably the strap 16 is passed through the slots 40 in the brace 14 until the distal end of strap 16 that contains the slots 44 in the strap has passed through both slots and then the strap is bent so that the strap forms a straight portion between the slots 44, a straight, tangential portion between the sidewalls 24 and the sidewalls of the tank 12, and a curved portion around the periphery of the tank that abuts the strap 16. Advantageously the strap 16 is bent in this configuration before use.

The tank 12 may, with time or vibration, begin to slide along the length of the sidewalls 24 and edges 26. But as mentioned above, the brace 14 advantageously has notches 30a, 30b extending inward from the edges 26a, 26b, respectively, with the notches 30 sized to receive the bead 28 of a welded tank 12 so that if the tank 12 begins to slip downward after installation, then the bead 28 abuts the lower edge of the notch and creates a further interference fit which restrains movement in the vertical direction in which the sidewalls 24 and their edges 26 are oriented during normal use. The preferred notches 30 have two inclined walls 90° apart and extend a depth of about ⅛-3/16 inches from the edge 26. The notches 30 are spaced apart from the back 22 and the slots 40 by a distance corresponding roughly to the width of the sidewall 24. The notches 30 are located between the ends of the slots 40 relative to a longitudinal axis of each side wall 24a, 24b. Thus, each strap 16a, 16b pulls the tank 12 against the edge 26 on opposing sides of the notch 30a, 30b in the respective side wall.

The tank 12 usually has cylindrical sidewalls, typically of metal such as steel or aluminum, but possibly plastic. The tank 12 may be an expansion tank having a flexible diaphragm dividing the interior of the tank into compartments. Expansion tanks are typically 8 to 13 inches in diameter, although the size may vary above or below that range. The tank 12 may be a water filtration unit, which usually has a sidewall about 2 to 4 inches or more in diameter. The nature and diameter of tank 12 may vary. The straps 16 are long enough to encircle the tank 12, pass through slots 40 of the brace 14, and be connected by connector 18, and then be tightened to clamp the tank against the edges 26 of the sidewalls 24. The sidewalls 24 are preferably parallel, and because the abutting sidewall of the tank is curved the inner corner of the sidewall 24, the corners nearest each other, will abut the tank first and create the greatest interference fit as the tank is clamped to the brace. Advantageously the notches 30 are located between two straps 16, such that strap 16a passing through slots 40a is above strap 16b passing through slots 40b. But one strap may be used if desired, especially for smaller tanks 12 or lighter tanks 12.

The sidewalls 24 are spaced apart a distance sufficient to provide a stable support for the tank, but spaced close enough together that the curved surface of the tank does not splay the sidewalls 24 outward into a surface contact with a side of the sidewall 24 rather than an edge contact with the edges 26 of the sidewalls of the brace 14. A spacing of about two inches is believed suitable for a tank having a diameter of 8-14 inches, and a spacing of about one inch is believed suitable for tank diameters of about 2-6 inches. The sidewalls 24 preferably extend a distance of about 1.5 inches from the back 22, and have a length of about 5-6 inches, with the back 22 having a length of about 7-8 inches, preferably about 7.5 inches, for expansion tanks of about 6-15 inches in diameter. The sidewalls 24 may be parallel, but for ease of shipping the sidewalls 24 may be slightly outwardly inclined at an angle of a few degrees, preferably under 5°, so the braces 14 may be nested or stacked together for shipping. As used herein, generally parallel sidewalls 24 means not only parallel sidewalls but sidewalls 24 that are inclined slightly outward inclinations of up to about 7° from an axis orthogonal to the back 22. While a slight inclination of sidewalls 24 is desirable for nesting, it is believed suitable to assemble the braces 14 with straps 16 placed through the sidewalls, ready for use.

It is believed suitable to have the sidewalls 24a, 24b inclined slightly toward each other by an amount that aligns a plane through each sidewall to intersect the centerline of tank 12 when connected to the brace 14. Such an inclination will abut the edges 26a, 26b flat against a cylindrical exterior surface of the tank 12 rather than one corner of the edge digging into the exterior surface.

The straps 16 are preferably, but not necessarily, of metal such as stainless steel to avoid corrosion and stretching. The connector 18 is preferably a device such as a threaded screw used on a hose clamp for tightening and securing the strap 16 around the tank 12. Advantageously the connector 18 is has a quick-acting feature which facilitates rapid installation, tightening and removal of the strap. Over-center cam-latches or threaded hose clamps are believed suitable.

The brace 14 of the bracket assembly 10 has openings 40 which cooperate with the strap or straps 16 to secure the supported device against the saddle feature and hold it in position. The brace 14 has recesses or indentations or notches 30 which advantageously allow it to take advantage of a raised weld seam 28 which typically encircles the circumference of an expansion tank as an artifact of its fabrication, said recesses or indentations 30 in the brace cooperating with the weld seam 28 to secure the expansion tank 12 against longitudinal motion along the axis of the tank. Advantageously, the brace 14 is fastened to support 20, such as a post or wall adjacent the appliance to which the tank 12 held by the bracket assembly 10 is to be connected. Fasteners 38 taking the form of #8 X 1½ inch sheet metal screws are believed suitable for connecting the brace 14 to the support 20, although the specific fasteners 38 that are used will vary with the tank size, weight and mounting conditions.

Figure 7:
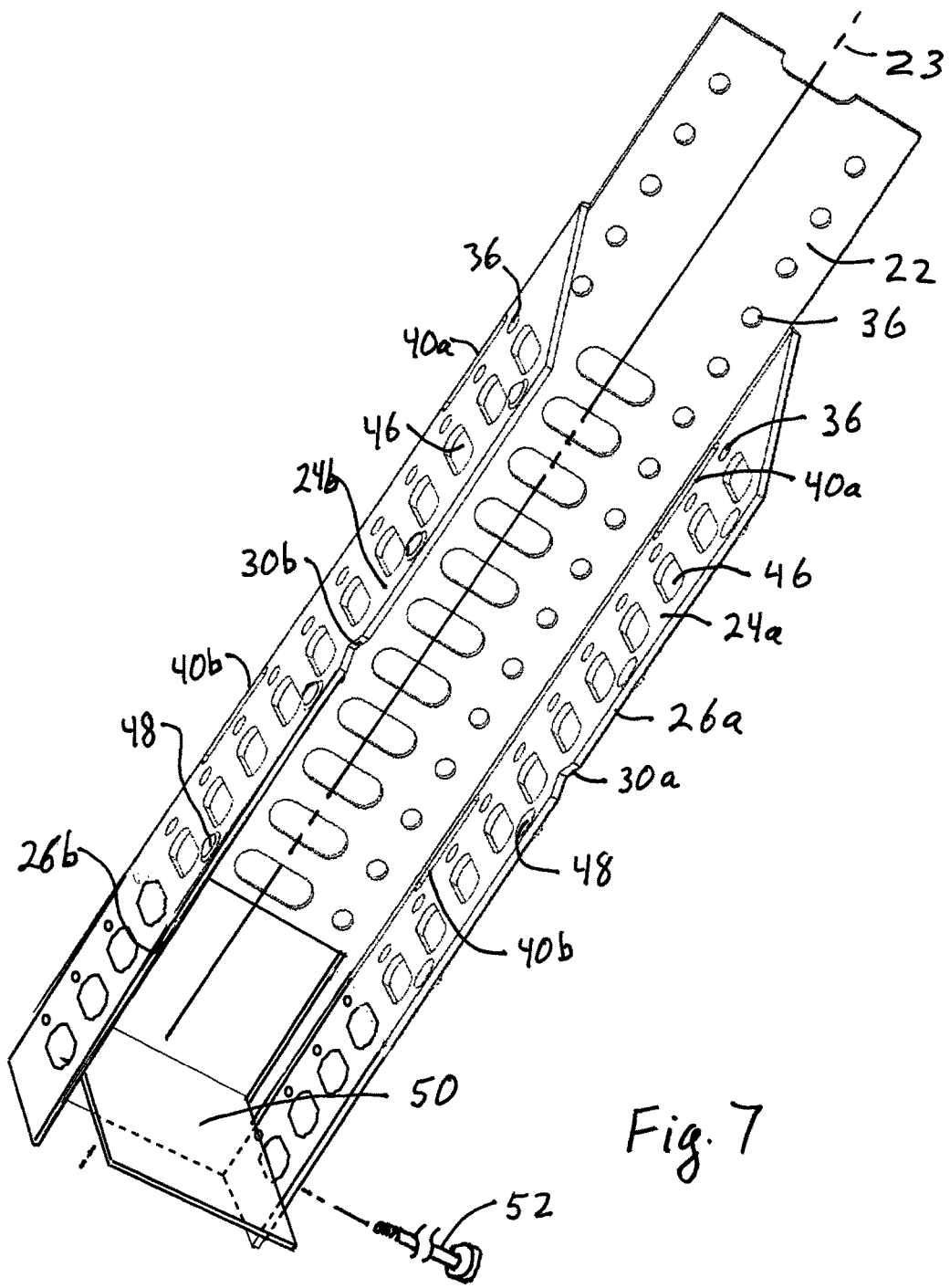
FIG. 7 is a front perspective view of a the brace or bracket of FIG. 3 with a bottom support bent outwards from a back of the brace or racket.
Figure 8:
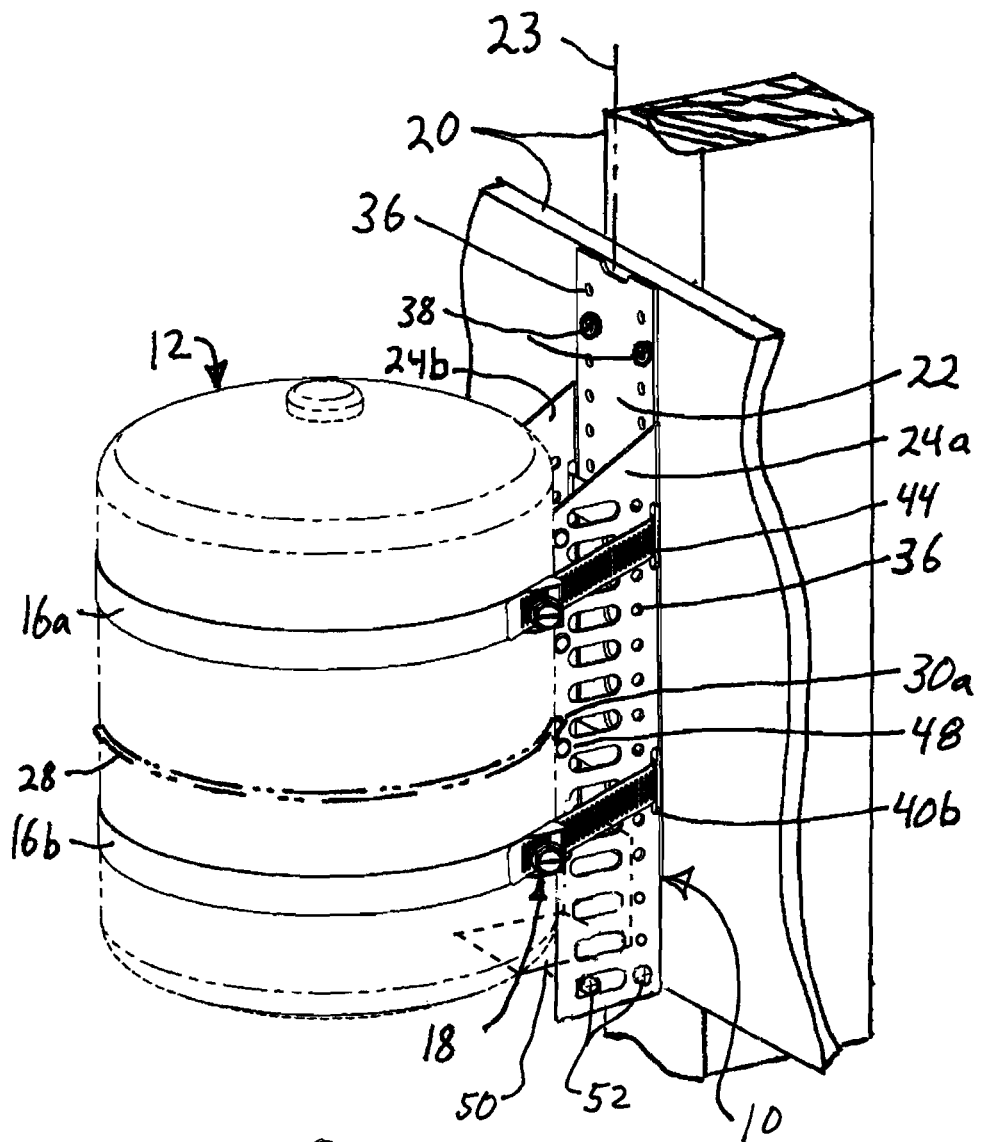
FIG. 8 is a perspective view of the brace or bracket of FIG. 7 in use with the strap of FIG. 1.
Figure 9:
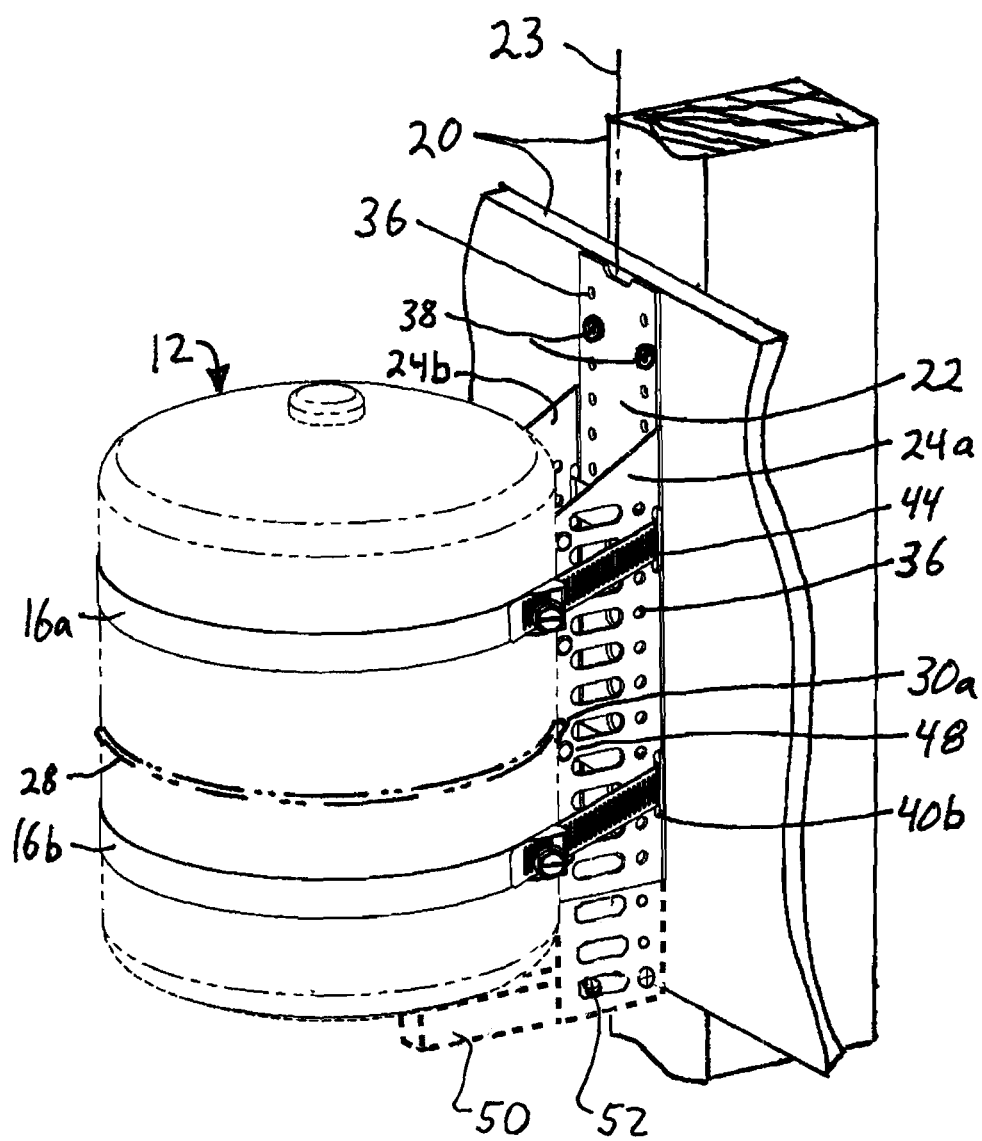
FIG. 9 is a perspective view of the brace or bracket of FIG. 3 in use with a bottom support fastened to the brace or bracket.

Referring to FIGS. 7-9, the brace 14 may optionally include at least one bottom support 50 protruding from at least one end of the saddle in a direction away from the building mounting surface so as to cooperate with the shape of the device being supported, to further secure the expansion tank against longitudinal motion. FIGS. 7-8 show a rectangular bottom support 50 punched out of the back 22 of the brace 14 and bent perpendicular to the back 22. The bottom support 50 extends beyond the distal edge of sidewalls 24a, 24b a distance sufficient to engage a bottom edge of the tank 12. As desired, a threaded fastener 52 may extend between sidewalls 24a, 24b adjacent the edges 26a, 26b and located below the bottom support 50 in order to provide additional support for the bottom support 50. A nut (not shown) may engage the threaded end of the fastener 52 to retain the fastener in the brace 14.

FIG. 9 shows, in broken lines, an extended brace 14 and a bottom support 50 comprising a bar or other elongated member having holes therein through which pass threaded fasteners 52 that extend between opposing sidewalls 24a, 24b in order to fasten the bottom support to the brace 14. The bottom support 50 in the form of the elongated member also extends beyond the distal edge of sidewalls 24a, 24b a distance sufficient to engage a bottom edge of the tank 12. The bottom support 50 is advantageous for larger and heavier devices such as larger expansion tanks.

Although preferably mounted to the building surface 20 so that the axis of the supported device 12 is oriented vertically when used with heavier devices, with the appropriate combination of dimensions and materials, the bracket assembly 10 could be mounted in any orientation desired. The back 22 preferably is placed flat against the support 20 during use, with the exterior or outward facing surface of back 22 being flat. This allows improved contact between the support 20 and back 22 and helps reduce deformation of the back 22 during use.

As seen in FIGS. 3-6, the sidewalls 24 and back 22 may have a plurality of other openings 46 to provide for further functionality that allows the brace 14 to be used in other applications. There is advantageously a plurality of parallel, aligned slots 46 contained completely within each of the sidewalls 24a, 24b, in corresponding locations so the sidewalls 24a, 24b have the same openings 46 at the same locations. The openings 46 are shown as a series of slots with rounded ends with all of the openings having the same shape and being spaced a uniform distance apart. The slots 46 are about ¼ inch wide and about one inch long with rounded ends. A series of fastener openings 36 are located on the axis of each slot 46 as shown in the figures, located between the slots 46 and the back 22. The back 22 has similar slots 46, but shorter with a length of about ⅝ inch and with a fastener opening 36 on opposing ends of each slot 46. Also, the upper end of the sidewalls 24 are preferably inclined toward the back 22 at an angle of about 60° from the vertical and 30° from the horizontal. Further, outwardly extending deformations or spherical dimples 48 may be formed at regular intervals along the distal edges of sidewalls 24. Four, dimples 48 are shown on each sidewall. The slots 46, fastener holes 36 and dimples 48 in the sidewalls provide further functionality for the brace in other applications.

The brace 14 is preferably stamped or cut from a flat sheet of material, preferably about 16 gage galvanized steel strap, with the side walls 24 bent to form the U-shape channel after the various openings 36, 40, 44, 46 and deformations 48 and notches 30 are formed. The U-shaped braces 14 and one or two straps 16 and connectors 18 are then usable as a kit, which may optionally be packaged, boxed, or shipped together. Preferably the straps 16 of the preferred hose clamp are bent to the described configuration of FIG. 3 before shipment of the kit. Upon receipt, the straps 16 are inserted through the aligned slots 40. Two straps 16 are preferred, but one strap may be used for smaller tanks 12. Ideally, the bracket assembly 10, including brace 14 and strap(s) 16 and connector 18 are loosely placed over tank 12 and shipped as a unit comprising a tank and mounting bracket 10, with the tank removed so the brace 14 may be fastened to the support 20, and then the tank 12 connected to the brace via straps 16 and connector 18.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. An apparatus for holding a fluid expansion tank to a building support, comprising:
    a single-piece bracket having a flat back and two opposing side walls forming a U shaped cross section with the side walls ending in generally parallel edges, each side wall having at least one slot aligned with the slot in the other wall, each slot being parallel to the back and immediately adjacent thereto and extending parallel to a longitudinal axis of the back, the back of the bracket having a plurality of fastener holes sized to pass the shaft of a fastener while preventing passage of a head of the fasteners during use; and
    at least one hose clamp strap and first connector comprising a first strap extending through and along a straight line between the at least one aligned slots in each side wall, the first strap having a length sufficient to encircle the tank during use.

2. The apparatus of claim 1, wherein each side wall edge has an aligned notch therein sized to receive a weld bead on said tank and abut one edge of that bead during use, the notch being located so it is between the first and second straps during use.

3. The apparatus of claim 2, wherein the at least one slot comprises at least a first and second slot in each sidewall aligned with a first and second slot in the opposing sidewall, each first and second slot in each sidewall being spaced apart a distance D; and
    a second hose clamp strap and a second connector with the second strap extending through the second set of aligned slots, the second strap having a length sufficient to encircle the tank during use.

4. The apparatus of claim 3, further comprising a bottom support extending from a lower end of the bracket a distance sufficient to engage a bottom of the tank during use.

5. The apparatus of claim 4, wherein the bottom support comprises a portion of a back of the bracket bent outward.

6. The apparatus of claim 5, further comprising a threaded fastener extending between the sidewalls below the bottom support and adjacent thereto in order to limit downward movement of the bottom support during use.

7. The apparatus of claim 4, wherein the bottom support comprises an elongated member fastened to the sidewalls by threaded fasteners.

8. The apparatus of claim 3, wherein the distance D is a about 2-3 inches and further comprising a notch that is less than about one-quarter of an inch deep.

9. The apparatus of claim 3, wherein the slots have a length about twice the width of the strap passing therethrough and a width less than about ten times a thickness of the strap passing therethrough.

10. The apparatus of claim 2, wherein the side walls have a plurality of parallel, aligned slots therein contained completely within the sidewalls.

11. The apparatus of claim 2, wherein the back is longer than the side walls.

12. The apparatus of claim 2, further comprising a fluid expansion tank having a cylindrical tank sidewall having a diameter of about 4-15 inches with a welded bead encircling the tank sidewall, the bead fitting in the notch and the hose clamps encircling the tank sidewall and clamping the tank against the edges of the two sidewalls.

13. The apparatus of claim 3, further comprising a fluid expansion tank having a diameter of about 8-13 inches with a flexible diaphragm dividing the tank into compartments, the tank having a cylindrical tank sidewall with a welded bead encircling the tank sidewall, the bead fitting in the notch and the hose clamps encircling the tank sidewall and clamping the tank against the edges of the two sidewalls, and wherein the sidewalls are about two inches apart.

14. A kit for holding a fluid expansion tank against a building support, comprising:
    a single-piece bracket having a back and two opposing side walls forming a U shaped cross section, the side walls having first and second sets of aligned slots parallel to the back and immediately adjacent thereto, one slot of each set being on separate longitudinal axes parallel to each other, the first and second set of slots spaced apart from each other a distance D measured relative to a longitudinal axis of the back, one slot from each set of slots being coaxial with an axis that is parallel to the longitudinal axis, the back of the bracket having a plurality of fastener holes sized to pass the shaft of a fastener while preventing passage of a head of the fasteners during use;

a first hose clamp strap and first connector with the first strap sized and configured to extend through the first set of aligned slots, the first strap having a length sufficient to encircle the tank and pass through the first two aligned slots during use; and a second hose clamp strap and second connector with the second strap extending through the second set of aligned slots and between the side walls along a straight line, the second strap having a length sufficient to encircle the tank and pass through the second two aligned slots during use.

15. The apparatus of claim 14, wherein each side wall edge has an edge having an aligned notch therein sized to receive a weld bead on said tank and abut one edge of that bead during use, the notch being located within the distance D as measured along the longitudinal axis.

16. The apparatus of claim 15, wherein the distance D is a few inches and the notch is less than about one-quarter of an inch deep.

17. The apparatus of claim 15, further comprising a bottom support extending outward from the bracket and extending outward beyond the sidewalls a distance to engage a bottom of the tank during use.

18. The apparatus of claim 15, wherein the side walls have a plurality of parallel, aligned slots therein contained completely within the sidewalls.

19. The apparatus of claim 15, wherein the back is longer than the side walls.

20. The apparatus of claim 15, further comprising a fluid expansion tank having a diameter of about 4-15 inches with a welded bead encircling the tank, the bead fitting in the notch and the hose clamps encircling the tank and clamping the tank against the edges of the two sidewalls.

21. The apparatus of claim 15, further comprising a fluid expansion tank with a flexible diaphragm dividing the tank into compartments, the tank having a cylindrical tank sidewall with a welded bead encircling the tank sidewall, the bead fitting in the notch and the hose clamps encircling the tank sidewall and clamping the tank sidewall against the edges of the two bracket sidewalls.

22. A method for holding a fluid expansion tank against a support, comprising:

fastening a bracket to the support, the bracket having a back and two opposing side walls forming a U shaped cross section, the side walls having first and second sets of aligned slots immediately adjacent the back and extending parallel to a longitudinal axis through a center of the back, the first and second set of slots spaced apart from each other a distance D along the longitudinal axis, the back of the bracket having a plurality of fastener holes with the shaft of a plurality of fasteners passing through different ones of a plurality of said holes to fasten the bracket to the support;

placing the tank against the side walls;

encircling the tank with a first hose clamp strap having a first connector with the first strap extending through the first set of aligned slots and along a straight line between the side walls and tightening the first strap with the first connector to pull the tank against the bracket sidewalls; and encircling the tank with a second hose clamp strap having and second connector with the second hose extending through the second set of aligned slots and tightening the second strap with the second connector to pull the tank against the bracket sidewalls.

23. The method of claim 22, wherein the tank has a weld bead on a sidewall of the tank with the weld bead being located in a notch formed in an edge of each sidewall, the notches being further located between the first and second straps.

24. The method of claim 23, wherein the tank has a diameter of about 4-13 inches.

* * * * *

UNITED STATES PATENT AND TRADEMARK OFFICE
CERTIFICATE OF CORRECTION

PATENT NO. : 10,203,065 B2  
APPLICATION NO. : 15/441050  
DATED : February 12, 2019  
INVENTOR(S) : Larry Brown and Virgil O'Neil Page 1 of 1

It is certified that error appears in the above-identified patent and that said Letters Patent is hereby corrected as shown below:

In the Specification

Column 3, Lines 25, 32, and 67, delete "welded" and insert --weld--.
Column 4, Line 7, delete "welded" and insert --weld--.

In the Claims

Column 10, Lines 12-13, in Claim 2, delete "the first and second straps" and insert --the first strap and a second strap--.
Column 10, Line 18, in Claim 3, delete "; and" and insert --, and the apparatus further including:--.
Column 10, Line 19, in Claim 3, delete "a second hose clamp strap and".
Column 10, Line 49, in Claim 12, delete "welded" and insert --weld--.
Column 10, Line 56, in Claim 13, delete "welded" and insert --weld--.
Column 11, Lines 12-13, in Claim 14, delete "first two" and insert --first set of--.
Column 11, Lines 18-19, in Claim 14, delete "first two" and insert --first set of--.
Column 11, Line 20, in Claim 15, delete "apparatus" and insert --kit--.
Column 11, Line 25, in Claim 16, delete "apparatus" and insert --kit--.
Column 11, Line 28, in Claim 17, delete "apparatus" and insert --kit--.
Column 11, Line 32, in Claim 18, delete "apparatus" and insert --kit--.
Column 11, Line 35, in Claim 19, delete "apparatus" and insert --kit--.
Column 11, Line 37, in Claim 20, delete "apparatus" and insert --kit--.
Column 11, Line 39, in Claim 20, delete "welded" and insert --weld--.
Column 12, Line 4, in Claim 21, delete "welded" and insert --weld--.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*